Aug. 17, 1965          A. M. FINE          3,201,789
MOVING TARGET INDICATOR FOR A STACKED-BEAM COHERENT RADAR
Filed Dec. 21, 1960
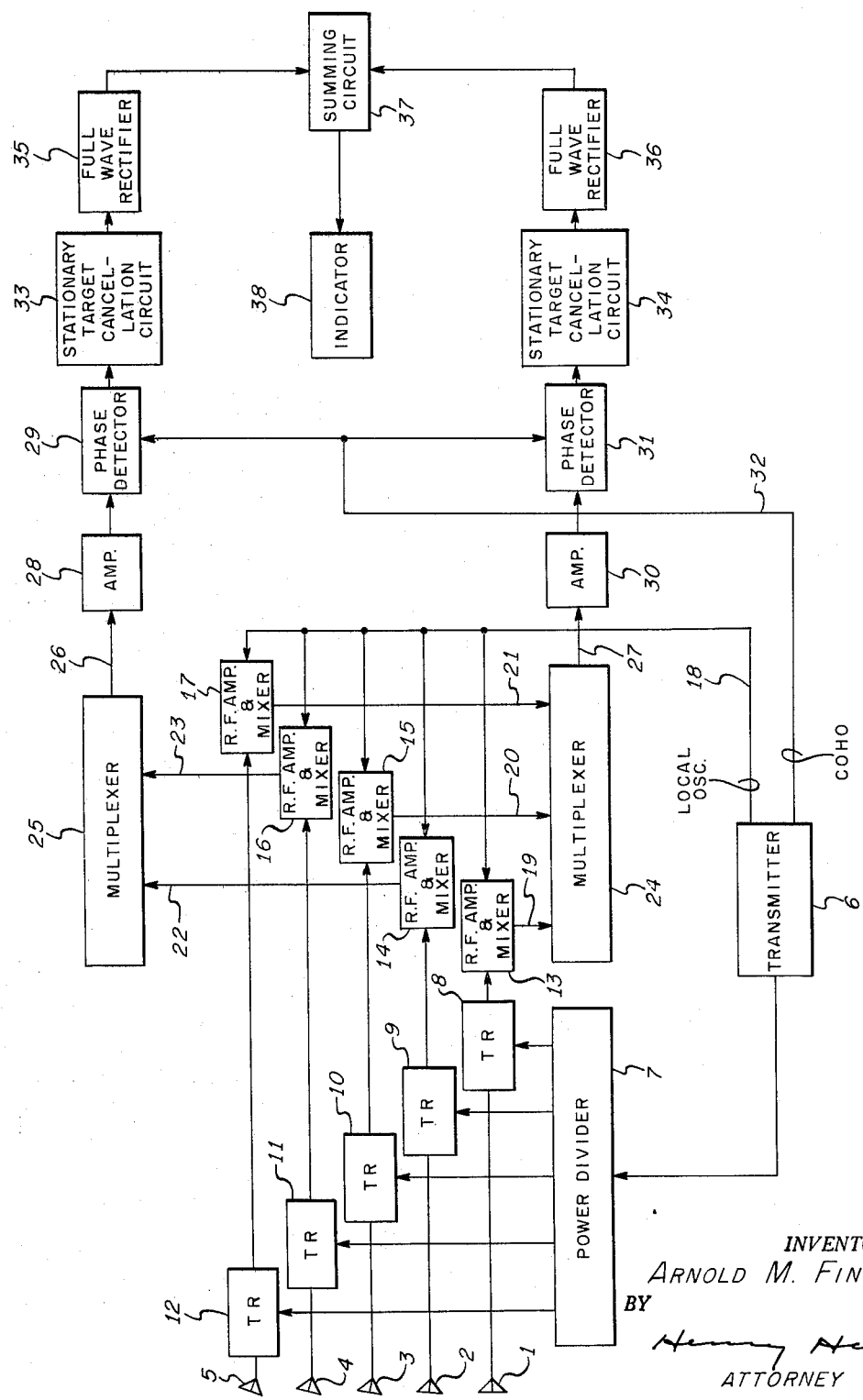
INVENTOR.
ARNOLD M. FINE
BY
ATTORNEY United States Patent Office 3,201,789
Patented Aug. 17, 1965

3,201,789
MOVING TARGET INDICATOR FOR A STACKED-BEAM COHERENT RADAR
Arnold M. Fine, Plainview, N.Y., assignor to Sperry Rand Corporation, Great Neck, N.Y., a corporation of Delaware
Filed Dec. 21, 1960, Ser. No. 77,472
5 Claims. (Cl. 343—7.7)

The present invention generally relates to radar moving target indicators and, more particularly, to a moving target indicator system for use in a stacked-beam radar of the coherent type.

As is well understood in the art, a stacked-beam radar incorporates a multiplicity of directional microwave antennas which are mounted or "stacked" one above the other in a vertical plane. Each of the stacked antennas comprising the stacked-beam antenna array is directed along a predetermined and respective elevation angle and is commonly energized by the same transmitter. The reflected target signals, received by each of the stacked antennas, are applied to respective receivers. Inasmuch as the beam patterns of the adjacent stacked antennas partially overlap in the vertical plane, a measure of the elevation angle of a target may be determined by comparing the relative received signal strengths in each of the respectively associated receivers. In general, signals from a target will be received in an adjacent pair of receivers.

Although moving target indication systems (MTI) are available in the art for application to single-beam radars, certain problems arise in adapting said systems for use in a stacked-beam radar. One factor that must be considered is the costly duplication that would be involved in providing separate MTI for each of the multiplicity of receiving channels. As might be expected, attempts to minimize apparatus duplication beget additional problems. For example, if the outputs from each of the receivers are first combined and then applied to a single MTI circuit, a substantial loss in detection volume results. This occurs because the phase difference between the target signals in adjacent receiver channels varies not only with target motion as desired but also is dependent upon, for example, waveguide electrical lengths, and the phase stability of the amplifiers comprising the receiver channels. The consequence is that the combining of the received target signals may result in cancellation of the signals whether or not said signals represent a moving target.

It is the principal object of the present invention to provide a moving target indication system for a stacked-beam radar of the coherent type.

Another object is to provide a moving target indication system for a stacked-beam radar requiring a minimum of apparatus while preserving the full target detection capability of the radar.

A further object is to provide a moving target indication system for stacked-beam radar which maintains a high target signal to noise ratio.

These and other objects of the present invention, as will appear from a reading of the following specification, are accomplished in a preferred embodiment by the provision of a stacked-beam radar of the coherent type having a multiplicity of receiving channels. The target signals produced in alternate receiving channels are additively combined and applied to a first phase detector. The target signals produced in the intervening alternate receiving channels are additively combined and applied to a second phase detector. A coherent oscillator signal generated within the radar transmitter is applied jointly as a reference signal to each of the phase detectors. First and second stationary target cancellation circuits are coupled to the output of the first and second phase detectors, respectively. In this manner, target signals produced in the even numbered and in the odd numbered receiving channels of the stacked-beam radar are coherently detected separately and processed for the elimination of stationary target signals. The moving target signals produced at the output of the respective cancellation circuits are separately full wave rectified and then combined for application to a target indicator.

For a more complete understanding of the present invention, reference should be had to the following specification and to the drawing which is a simplified block diagram of a preferred embodiment of the invention.

In the drawing, a stacked-beam antenna array is generally represented by the multiplicity of individual directional antennas 1–5, five being shown by way of example. Each of the directional antennas 1–5 is oriented along a respective and predetermined elevation angle and is so positioned that there is some degree of overlap in the vertical plane between the beam patterns of the adjacent ones of said antennas.

Each of the individual directional antennas 1–5 is energized by a common transmitter 6 whose output is applied to power divider 7. Power divider 7 applies to the directional antennas 1–5 predetermined proportions of the total power output of transmitter 6. For example, in order to extend the range coverage of the stacked-beam radar system, more power is directed into the lower elevation angle antennas than to the ones which are oriented along higher elevation angles. The individual outputs of divider 7 are coupled via respective TR devices 8–12 to the individual stacked antennas.

Each of RF amplifiers and mixers 13–17 is coupled to a respective one of the stacked antennas by TR devices 8–12. Transmitter 6 produces on line 18 a local oscillator signal which is jointly applied to each of the RF amplifiers and mixers 13–17 so as to produce on output lines 19–23 amplified target signals at a convenient intermediate frequency. The IF signals appearing on lines 19, 20, 21 are jointly applied to multiplexer 24. The IF signals appearing on lines 22 and 23 are jointly applied to multiplexer 25. Each of multiplexers 24 and 25 additively combine the IF signals respectively applied thereto on a single output line. It will be seen that the IF signals appearing on line 26 at the output of multiplexer 25 result from target signals received by the even numbered antennas 2 and 4. On the other hand, IF signals appearing on line 27 at the output of multiplexer 24 result from target signals received by the odd numbered antennas 1, 3 and 5. In this manner, the possible self-cancellation of a target signal jointly received by adjacent stacked antennas is obviated. Such self-cancellation might otherwise result if a target signal were jointly received by adjacent stacked antennas and then additively combined in the same multiplexer. As previously mentioned, the phase difference between the signals received by adjacent antennas from the same target might vary independently of target motion whereby the signals would tend to cancel if combined.

The target signals on line 26 are applied by an amplifier 28 to the first input terminal of phase detector 29. Similarly, the target signals appearing on line 27 are applied by an amplifier 30 to a first input terminal of phase detector 31. A coherent oscillator signal is generated by transmitter 6 and applied via line 32 jointly to the second input terminals of phase detectors 29 and 31. Representative coherent radar techniques for generating both the local oscillator signal of line 18 and the coherent oscillator signal of line 32 are discussed in Radar System Engineering, Radiation Laboratory Series, vol. I, chapter 16, McGraw-Hill, 1947.

Each of phase detectors 29 and 31 produce output pulses having an amplitude representing the phase difference between the target signal and the coherent reference signal of line 32 and a polarity representing the sense of said phase difference. It will be apparent that pulses of substantially identical amplitude and polarity are produced at the output of each phase detector in the event that the target signal results from a stationary target. On the other hand, the output pulses produced by the phase detectors will vary in both amplitude and polarity in the case of moving targets. The substantial identity of the successive pulses resulting from fixed targets and the amplitude and polarity changes in the successive pulses resulting from moving targets provides the basis for discrimination against fixed targets.

It should be noted that target pulses at the outputs of detectors 29 and 31 may be of either polarity, depending upon the relative phase between the target signals and the coherent reference signals applied thereto. For this reason, the phase detector output signals cannot be directly combined for application to a single stationary target cancellation circuit. That is, signals produced in adjacent receiver channels by a single target might generate pulses of like amplitude but opposite polarity at the respective outputs of detectors 29 and 31. Self cancellation would result if said pulses were directly combined. In accordance with the present invention, however, such undesirable self-cancellation of target signals is eliminated by the provision of separate stationary target cancellation circuits 33 and 34.

Cancellation circuits 33 and 34 may be of conventional design as described, for example, in chapter 16 of the aforementioned Radiation Laboratory Series book. Briefly, each circuit delays an incoming target pulse by an amount precisely equal to the radar pulse repetition interval. The delayed pulse is fed back and subtractively combined with the next succeeding target pulse to produce a residual pulse in the event that the pulse fed back and the next successive pulse are not of the same amplitude and polarity. The residual pulse may be of either polarity and is produced only by moving targets.

The residual pulse outputs of circuits 33 and 34 are applied by a respective one of full wave rectifiers 35 and 36 to summing circuit 37. Full wave rectifiers 35 and 36 each operate to convert the residual target pulse outputs of the respective cancellation circuits into pulses of common polarity for non-cancelling additive summation in circuit 37. In the illustrative embodiment, the output of circuit 37 is applied to a conventional target indicator 38.

It can be seen from the preceding specification that the objects of the invention have been achieved by the multiplexing of target signals received by even numbered stacked antennas into a first data channel, the multiplexing of target signals received by odd numbered stacked antennas into a second data channel, and by the separate phase detection and stationary target cancellation of each of the data channel signals. In this manner, a moving target indication system has been provided for a stacked-beam radar of the coherent type which reduces the required apparatus to a minimum without compromising the inherent target detection capability of the radar.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus including a stacked-beam radar of the coherent type having a multiplicity of receivers, each receiver separately receiving target signals intercepted by a respective one of a multiplicity of antennas comprising the stacked antenna array of said radar, a plurality of multiplexers, each multiplexer being connected to respective ones of said receivers for additively combining the output signals thereof, a plurality of means for coherently phase detecting the output signals of said multiplexers, each said means being connected to a respective one of said multiplexers, a plurality of stationary target signal cancellation circuits, each said cancellation circuit being connected to the output of a respective one of said means, a signal summing circuit, and a plurality of full wave rectifiers, each said rectifier connecting the output of a respective one of said cancellation circuits to said summing circuit.

2. Apparatus including a stacked-beam radar of the coherent type having a multiplicity of receivers, each receiver separately receiving target signals intercepted by a respective one of a multiplicity of antennas comprising the stacked antenna array of said radar, a plurality of multiplexers, each multiplexer being connected to respective ones of said receivers for additively combining the output signals thereof, a plurality of phase detectors for coherently phase detecting the output signals of said multiplexers, each said phase detector being connected to a respective one of said multiplexers, a plurality of stationary target signal cancellation circuits, each said circuit being connected to the output of a respective one of said phase detectors, a signal summing circuit, a plurality of full wave rectifiers, each said rectifier connecting the output of a respective one of said cancellation circuit to said summing circuit, and target signal indicating means connected to the output of said summing circuit.

3. Apparatus including a stacked-beam radar of the coherent type having a multiplicity of receivers, each receiver separately receiving target signals intercepted by a respective one of a multiplicity of antennas comprising the stacked antenna array of said radar; a pair of multiplexers, one of said multiplexers being connected to alternate ones of said receivers for additively combining the output signals thereof, and the other of said multiplexers being connected to the intervening alternate ones of said receivers for additively combining the output signals thereof; a pair of means for coherently phase detecting the output signals of said multiplexers, each said means being connected to a respective one of said multiplexers, a pair of stationary target signal cancellation circuits, each said circuit being connected to the output of a respective one of said pair of means, a signal summing circuit, and a pair of full wave rectifiers, each said rectifier connecting the output of a respective one of said cancellation circuits to said summing circuit.

4. Apparatus including a stacked-beam radar of the coherent type having a multiplicity of receivers, each receiver separately receiving target signals intercepted by a respective one of a multiplicity of antennas comprising the stacked antenna array of said radar, said radar including a source of coherent oscillations, a plurality of multiplexers, each multiplexer being connected to respective ones of said receivers for additively combining the output signals thereof, a plurality of phase detectors, each phase detector being connected to the output of a respective one of said multiplexers, means for applying said coherent oscillations jointly to said phase detectors, a plurality of stationary target signal cancellation circuits, each said cancellation circuit being connected to the output of a respective one of said plurality of phase detectors, a signal summing circuit, and a plurality of full wave rectifiers, each said rectifier connecting the output of a respective one of said cancellation circuits to said summing circuit.

5. Apparatus including a stacked-beam radar of the coherent type having a multiplicity of receivers, each receiver separately receiving target signals intercepted by a respective one of a multiplicity of antennas comprising the stacked antenna array of said radar, said radar including a source of coherent oscillations, a pair of multiplexers, one of said multiplexers being connected to alternate ones of said receivers for additively combining the output signals thereof and the other of said multiplexers being connected to the intervening alternate ones of said receivers for additively combining the output signals thereof; a pair of phase detectors, each phase detector being connected to the output of a respective one of said multiplexers, means for jointly applying said coherent oscillations to said phase detectors, a pair of stationary target signal cancellation circuits, each said circuit being connected to the output of a respective one of said phase detectors, a signal summing circuit, a pair of full wave rectifiers, each rectifier connecting the output of a respective one of said cancellation circuits to said summing circuit, and target signal indicating means connected to the output of said summing circuit.

References Cited by the Examiner

UNITED STATES PATENTS

| | | | |
|---|---|---|---|
| 2,659,079 | 11/53 | Cunningham | 343—7.7 |
| 2,810,905 | 10/57 | Barlow | 343—100 |

CHESTER L. JUSTUS, *Primary Examiner.*

FREDERICK M. STRADER, *Examiner.*